June 20, 1939.  C. A. NERACHER ET AL  2,162,785
POWER TRANSMISSION
Filed Sept. 2, 1936  2 Sheets-Sheet 2

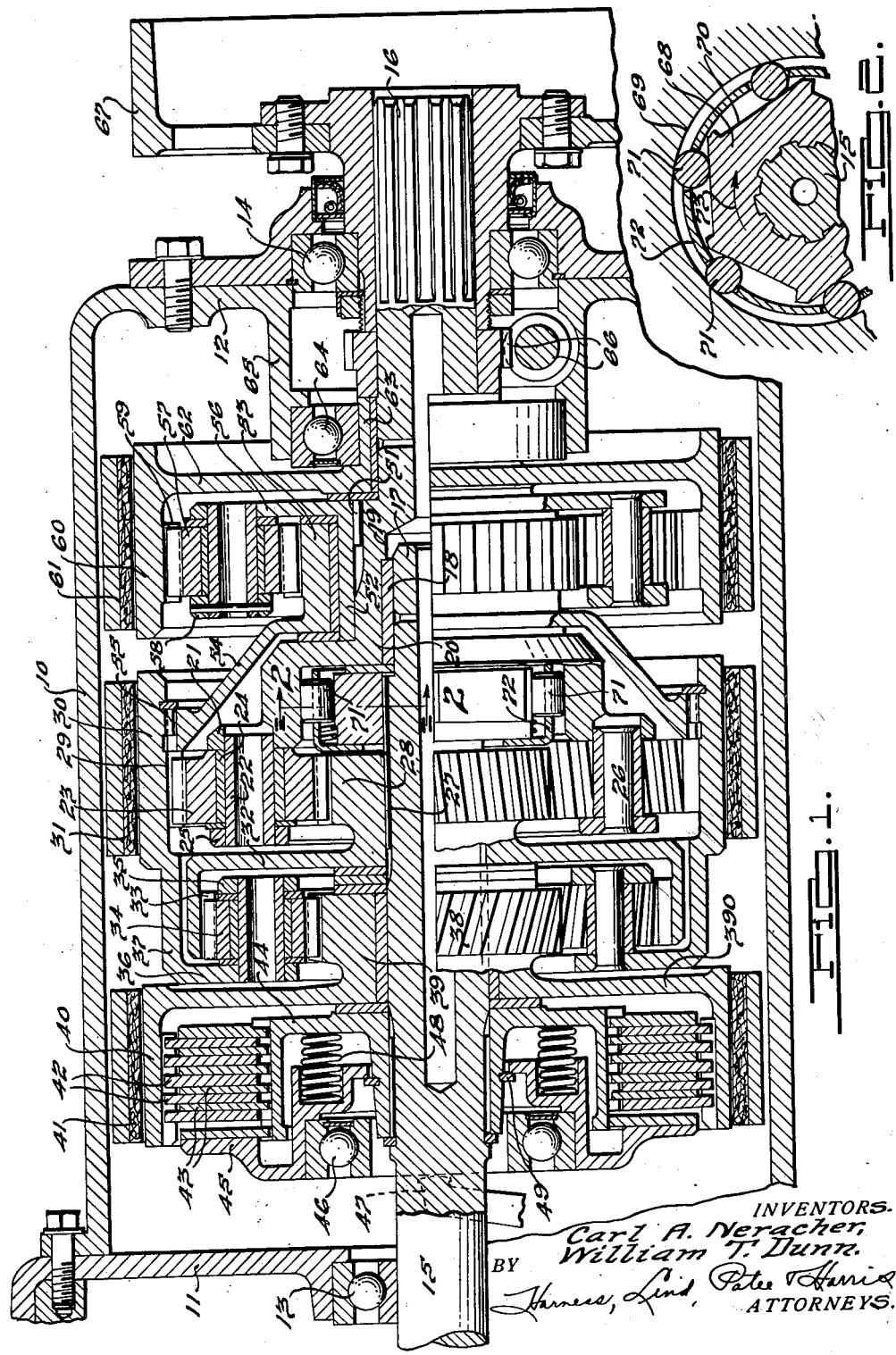

INVENTORS.
Carl A. Neracher,
William T. Dunn.
BY Harness, Dind, Pate & Harris
ATTORNEYS.

Patented June 20, 1939

2,162,785

UNITED STATES PATENT OFFICE 2,162,785

POWER TRANSMISSION

Carl A. Neracher and William T. Dunn, Detroit, Mich., assignors to Chrysler Corporation, Highland Park, Mich., a corporation of Delaware Application September 2, 1936, Serial No. 99,013

21 Claims. (Cl. 74—268)

This invention relates to power transmissions and refers more particularly to improvements in transmissions of the planetary gear types such as are adapted for use in driving motor vehicles, for example. In certain broader aspects of our invention, our improvements are not limited to power transmissions of the planetary type.

In motor vehicle transmissions, especially of the planetary gear types, it is customary to selectively brake or clutch rotary control elements of the gear sets in establishing the various speed ratio drives including the customary direct and reverse drives. Inasmuch as considerable effort is ordinarily required to effect a change in the speed ratio drive, as well as to maintain a selected drive, it is usually the practice to provide a source of motive power to operate the clutch or brakes. This power source is generally derived from the motor vehicle engine by use of the intake partial vacuum, mechanical transmission of power from the engine, or by use of a fluid pressure system embodying a pump driven by the engine. In any event, it sometimes happens that the engine cannot be started, as in very cold weather, or that the transmission operating mechanism for other reasons cannot be manipulated to effect a driving couple between the engine and vehicle driving ground wheels. Under such conditions, the engine cannot be conveniently started by towing or pushing the vehicle, as is desirable.

Furthermore, with the aforesaid types of transmissions, the engine is not coupled with the vehicle driving wheels through the transmission in the event that the transmission manipulating mechanism is not operated and dangerous circumstances result from the failure to use, or to be able to use, the engine as a brake, especially on a down-hill coast.

It is an object of our invention to provide simple and effective means for overcoming the aforesaid difficulties.

A further object of our invention is to provide a positive driving connecting means between the driving and driven shafts, preferably establishing a direct drive, whereby the engine will be immediately picked up by the driven shaft when the latter tends to overrun the driving shaft.

We preferably carry out our objects by providing a reversely acting overrunning clutch so related with respect to the transmission parts that during normal vehicle drives the overrunning clutch overruns, but clutchingly couples the engine with the driving vehicle ground wheels in response to tendency of the driven shaft to overrun the driving shaft. Such an arrangement also automatically drives the engine from the vehicle driving ground wheels so that a dead engine may be started by rolling the vehicle without requiring the manipulation of the transmission into any of its settings.

Further objects of our invention reside in the provision of an improved planetary gearing; by providing improved speed relationships in the gear trains, as in the second speed drive; by dividing the speed and load from the driving shaft directly to a pair of the planetary trains, resulting in quieter gear operation, less wear of the parts, and less tooth loads than heretofore; by providing improved rubbing speed conditions between adjacent sun gears where thrust loads are encountered through the use of helical gears.

Our improved planetary gearing arrangement furthermore affords minimization of pressure required on the direct drive control clutch to carry the direct torque, as in manipulating the transmission for a direct drive.

A still further object of our invention is to provide an improved planetary gearing arrangement making it possible, within ordinary limitations of space, to provide more favorable ratios of drive, especially for the second speed.

Additional features and advantages of our invention reside in the novel combination and arrangement of parts more particularly hereinafter described in detail in several embodiments, reference being had to the accompanying drawings in which:

Fig. 1 is a sectional elevational view through our planetary transmission illustrating one embodiment of our invention.

Fig. 2 is a detail sectional view through the overrunning clutch, the section being taken as indicated by the line 2—2 of Fig. 1.

Figure 3:
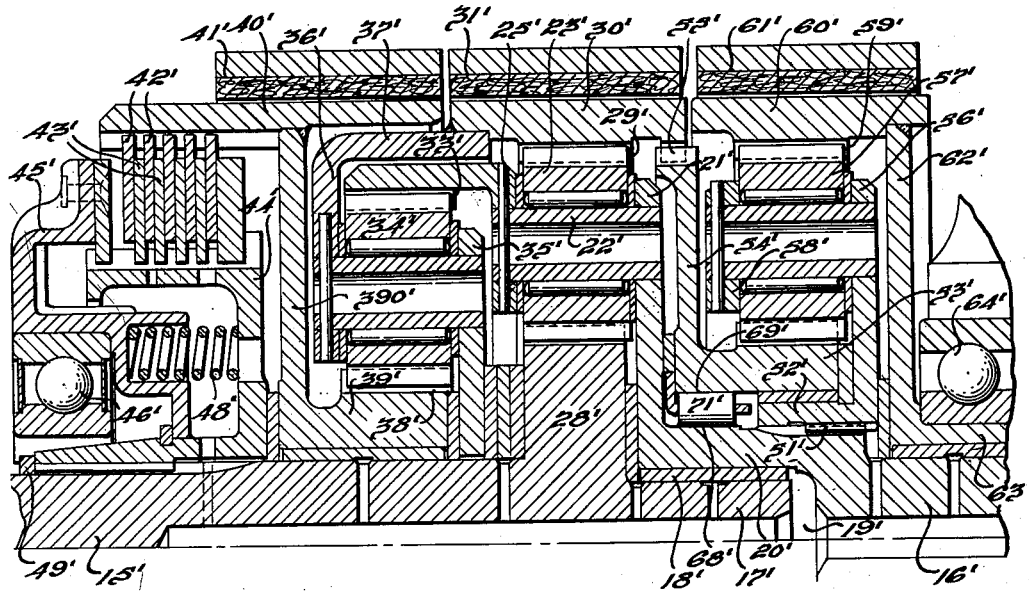
Fig. 3 is a sectional elevational view illustrating a modified form of our planetary transmission.

In the drawings, and referring particularly to Figs. 1 and 2, reference character 10 indicates the main casing for housing the working parts of the transmission, the casing front and rear wall structures 11 and 12, respectively, providing the anti-friction bearings 13 and 14 for journalling the driving and driven shafts 15 and 16, respectively.

The driving shaft 15 has a forward end 17 journalled by a bushing 18 in the forwardly opening bore 19 of the driven shaft 16, the forward end 20 of the driven shaft thus piloting the rear end of the driving shaft. The shaft end 20 terminates forwardly in the radially flange carrier 21 for the axles 22 of the first or low speed planetary gears 23. According to generally customary practice, each planetary gear train preferably includes a plurality of spaced planetary gears, preferably three in number, one of the gears 23 of the low speed trains being illustrated in the drawings.

The axle 22 journals its gear 23 by a suitable bearing such as the bushing 24, the companion carrier 25 being secured to carrier 21 at circumferentially spaced intervals by the rivets 26 which mount certain of the axles 22 between adjacent gears 23 and serve merely as spacers for the carriers 21 and 25 as illustrated at the bottom portion of these carriers in Fig. 1.

The gears 23 mesh with the primary driving sun gear 28 splined at 27 for driving connection with the driving shaft 15. The planetary gears 23 also mesh with the internal gear annulus 29 carried by the low speed drum 30 which is adapted for engagement by a brake 31.

The primary sun gear 28 has a forward annular hub 32 formed with an internal gear 33 meshing with the planetary gears 34 of the second speed train. These gears 34 are rotatably mounted between and carried by a rear carrier 35 and a companion forward carrier 36, the latter having a cylindrical flange 37 forming a structural extension of drum 30.

Gears 34 also engage the second speed sun gear 38 carried by the hub 39 of the radial flange 390 which in turn has secured thereto the second speed drum 40 which is adapted for engagement by a second speed brake 41.

The drum 40 also provides a clutching member for the direct or third speed, the clutch preferably comprising discs 42 driven by drum 40 and engageable with companion discs 43 which are drivingly connected to shaft 15 through a hub 44. The direct clutch discs are adapted for clutching engagement by a pressure plate 45 operated through a thrust bearing 46 by any suitable manually operated shifting device (not shown) connected to operate the thrust fork 47. The pressure plate 45 is normally yieldingly urged by springs 48 into its Fig. 1 position against a stop 49, this position being the disengaged relationship of discs 42 and 43.

For obtaining a reverse drive, the shaft 16 has a toothed engagement at 51 with a sleeve 52 mounted on the shaft end 20, this sleeve journalling the reverse sun gear 53 having the forward hub or flange 54 directly drivingly connected to drum 30 as by the toothed connection 55. The sleeve 52 has a rear radial flange 56 providing a carrier for the rotatable reverse planetary gears 57, the forward companion carrier comprising a ring 58.

The planetary gears 57 mesh with the aforesaid sun gear 53 and also with an internal gear 59 of the reverse drum 60 adapted for engagement by a brake 61. Drum 60 has a rear flange 62 extending inwardly to its hub 63 journalled between shaft 16 and bearing 64 carried by casing flange 65. The usual speedometer drive gears are illustrated at 66 and shaft 16 may, if desired, carry the brake drum 67.

Any well known means may be provided for selectively operating brakes 31, 41, 61 and the direct clutching pressure plate 45 for controlling the various speed ratio drives through the transmission, such means not being illustrated as it is well known. Normally, as illustrated, the brakes have clearance with their associated drums and the direct clutching discs 42 and 43 also have a normal clearance for the neutral setting or free condition of the transmission. For attaining a drive in low gear, brake 31 is actuated to arrest rotation of drum 30, all other brakes being free together with the direct clutch. Similarly, for second speed, brake 41 grips drum 40; for direct speed, the pressure plate 45 is moved rearwardly to engage the discs 42 and 43; and for reverse, brake 61 is actuated to grip the reverse drum 60. Only one of the brakes or the direct clutch is actuated at a time into gripping engagement with its associated drum, all other parts of the mechanism running freely.

When brake 31 is actuated for low gear drive, such drive is obtained by sun gear 28 operating planet gears 23 about their axes, the internal gear 29 being fixed and carrier 21 revolving in the direction of drive shaft 15 but at much lower speed.

When second speed is desired, brake 41 acts to hold drum 40 and sun gear 38 fixed, the primary driving sun gear 28 dividing its speed and torque by acting on the low speed planetary gears 23 and internal gear 33, this compounding action resulting in a second forward speed ratio drive to the driven shaft 16. Such arrangement divides the load to the second and low speed gear trains resulting in the aforesaid planetary gear operation, less wear and load on the gear teeth and running parts, and in good rubbing speed conditions especially between adjacent sun gears 28 and 38 where thrust loads are encountered by the use of helical gears. By such arrangements our invention provides improvements over the transmission disclosed in the application of Vidmar B. Stromquist and William T. Dunn, Serial No. 17,158, filed April 19, 1936.

When the pressure plate 45 is moved rearwardly to engage the direct clutch discs 42 and 43 to obtain the direct drive, the sun gears 28 and 38 are then both directly drivingly connected so as to rotate with the speed of the driving shaft 15 thereby causing the first and second speed gear train to rotate as a unit with shaft 15. The driven shaft 16 is thus directly connected to shaft 15 through the carrier 21.

With our improved direct drive, and the connection between sun 28 and internal gear 33, the pressure required to engage the direct clutch is reduced over that illustrated in the aforesaid co-pending application, Serial No. 17,158. In our invention the direct connection between internal gear 33 and driving shaft 15 has the effect of reducing the speed ratio of the second speed drive relative to the speed ratio of the second speed drive in Ser. No. 17,158 wherein the internal gear of the second speed planetary gear set is directly connected to the carrier of the planet gears of the low speed planetary gear set. It is assumed that for purposes of comparison the input torque and the gear sizes are constant in the two transmissions and that only the connection of the internal gear 33 is changed as aforesaid.

Under conditions of the same size gears and assuming the same input torque T of the driving shaft, the torque through the direct drive clutch in our invention or in Ser. No. 17,158, expressed in per cent of the input torque T, is as follows:

$$\text{Per cent of } T = T\left(1 - \frac{1}{R_2}\right)$$

In the above formula $R_2$ is the speed ratio or value of the second speed gearing which, in both instances, is compounded through the low speed planetary gear set. In a typical example of gear sizes, $R_2$ for Ser. No. 17,158 is about 1.60 as compared with about 1.28 of our invention. Applying these values in the above formula the torque through the direct clutch of Ser. No. 17,158 is about 37.5% of the input torque T as compared with about 22% of our invention. We have therefore reduced the thrust or load required to engage the direct clutch which, in turn, increases the life of the friction discs 42, 43 and minimizes load and wear on both the front and rear bearings 46 and 14 respectively. At the same time we have provided a very favorable second sped gear ratio less than that in Ser. No. 17,158 without having to enlarge the size of the transmission or otherwise alter the benefits obtained by the novel principles disclosed in Ser. No. 17,158.

For reversing the drive, brake 61 engages drum 60, the sun gear 28 transmitting the drive through the reverse gear train, it being noted that planet gear carrier 56 is fixed to the driven shaft 16 while the freely rotatable drum 30 is connected to the sun gear 53. The internal gear 59 being held, produces the reverse speed ratio drive between the shafts.

It will be understood that such terms as "low", "second", "third or high" as applied to the speed ratios are used in a relative sense in order to indicate the progressions in speed ratio values.

In connection with our improvements for connecting the driving shaft 15 to the driven shaft 16 when the latter tends to overrun the driving shaft, with the transmission in neutral or otherwise free; or for starting a dead engine by rolling the motor vehicle, we have provided a reversely acting overrunning clutch operating at a suitable point in the mechanism as between one of the shafts and an appropriate part of the planetary gearing. The overrunning clutch is reversely acting in the sense that it acts reversely from ordinary overrunning or free wheeling clutches since it overruns during all forward drives and clutches when the driven shaft tends to overrun the driving shaft.

In the Fig. 1 embodiment of our invention, this overrunning clutch comprises inner and outer clutching members 68 and 69, respectively. The inner member as best shown in Fig. 2 is drivingly connected to the driving shaft 15 through the splines 27 and is in the form of a cam 70, the outer member 69 comprising a cylinder formed intermediate the carrier 21 and the forward extension 20 of the driven shaft 16. Clutching rollers 71 operate between the cam 70 and cylinder 69, a spacer 72 maintaining the rollers in their proper circumferentially spaced relationship.

With the driving shaft 15 rotating in the normal direction of drive indicated by the arrow 73 in Fig. 2, it will be apparent that for all forward driving speed ratios through the transmission, the driven shaft is not rotating faster than the driving shaft so that the overrunning clutch will be inoperative in so far as wedging of the rollers 71 between cam 70 and cylinder 69 is concerned. However, when the shaft 16 tends to overrun the driving shaft 15 under any of the aforesaid conditions by way of example, these shafts will be directly connected together by reason of the rollers 71 being wedged between cylinder 69 and the high portions of the faces of cam 70.

Figure 4:
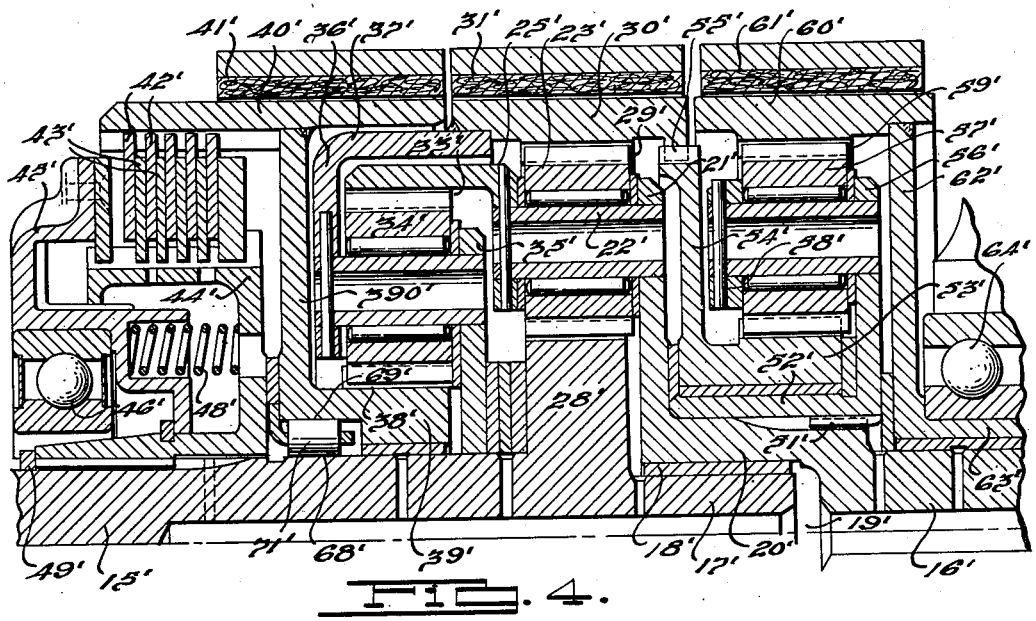
Fig. 4 is a view corresponding to Fig. 3 but illustrating a still further embodiment of our invention.

Referring to the modified forms of our invention illustrated in Figs. 3 and 4, the planetary gear sets illustrated therein are substantially similar to that disclosed in the aforesaid copending application, Serial No. 17,158 although in Figs. 3 and 4 we have illustrated modified arrangements for incorporating the reversely operating overrunning clutch. In Figs. 3 and 4 the parts of the planetary gear trains which correspond to those illustrated in Fig. 1 are referred to by corresponding primed reference characters, it being understood that the relationship of these parts and the operation thereof is the same as described in connection with the corresponding parts of Fig. 1 except as noted hereinafter.

In Figs. 3 and 4 the internal gear 33' of the second speed planetary gear set, is directly connected with the low speed planetary carrier 25' instead of being connected to the primary sun gear 28 as in Fig. 1. Furthermore, in Fig. 3 the overrunning clutch which is similar to that illustrated in Fig. 2 has its rollers 71' operating between the inner cam member 68' and the outer cylindrical clutching member 69'. The cam member 68' is formed as a part of the driven shaft forward extension 20' and the cylindrical portion 69' is formed as a part of the hub of the reverse sun gear 53'. In the Fig. 3 arrangement, the rollers 71' will be free for all transmission drives but will lock the shafts 16' and 15' together for a direct drive through the low speed planetary gear set 29', 23' and 28' when shaft 16' tends to overrun shaft 15'.

In Fig. 4 the corresponding overrunning clutch has the rollers 71' thereof cooperating as aforesaid with an outer cylindrical clutching member 69' formed as a part of the second speed sun gear hub 39' while the inner cam member 68' is formed as a part of the driving shaft 15'. In the Fig. 4 arrangement, the rollers 71' will overrun as aforesaid except when shaft 16' tends to overrun shaft 15' when these shafts will be directly connected through rollers 71' and the locking of the low speed and second speed planetary gear trains.

Thus, in Fig. 4, whenever the engine drives the vehicle the rollers 71' will be free. In the low gear drive drum 30 is fixed thereby holding carrier 36' against rotation. The drive from sun 28' thus causes carrier 25' to rotate slowly forwardly resulting in backward rotation of hub 39' and clutch member 69'. With clutch member 68' rotating forwardly and member 69' rotating backwardly, rollers 71' will be free from clutching.

In the second speed drive, Fig. 4, drum 40' is fixed and therefore member 69' is held while member 68' rotates forwardly to maintain rollers 71' free. In direct clutch members 68' and 69' rotate in unison. In reverse, drum 60' is fixed. Carrier 25' rotates backwardly (with driven shaft 16') as does drum 30' and carrier 35' resulting in backward rotation of hub 39' to free rollers 71' as for the low speed drive.

Assuming that the engine is dead and that the Fig. 4 transmission is in neutral, if the vehicle is towed or pushed forwardly then shaft 16' becomes the driver and operates in driving the engine as follows. Drum 30' rotates forwardly (assuming shaft 15' and sun 28' to be fixed) at an overdrive speed and carrier 35' has a forward overdrive faster than carrier 25' and internal gear 33' which rotate at the speed of shaft 16'. This arrangement causes hub 39' to have still faster forward rotation and thus member 69' picks up shaft 15' by wedging rollers 71'. As soon as shaft 16' starts to drive shaft 15', according to the foregoing analysis, rollers 71' are wedged and the low and second speed gear trains become locked resulting in a direct drive from shaft 16' to shaft 15'.

In our claims we have in certain instances referred to parts which drive one from the other as being "drivingly connected" and such driving connection may or may not embody an intermediary such as one or more of the gearing elements or associated parts. When a part is driven from another part at the same speed therewith such parts are in certain instances defined as being in "direct driving" relationship or as being "directly drivingly connected" with each other. Thus, by way of example, clutch member 68 of Fig. 2 is drivingly connected to shaft 15 and clutch member 69 is drivingly connected to shaft 16. In this instance such driving connections are of the direct driving character since members 68 and 69 are connected to shafts 15 and 16 respectively. In Fig. 3 member 68' is drivingly connected to shaft 16', such connection being specifically of a direct character, while member 69' is drivingly connected to shaft 15' through the intermediary of parts 54', 55', 29', 23' and 28' which go to make up such driving connection. In similar manner the member 69' in Fig. 4 is drivingly connected to shaft 16' through parts 39', 34', 33', 22', 21' and 20'.

Various modifications and changes will be apparent from the teachings of our invention, as defined in the appended claims, and it is not our intention to limit our invention to the particular details of construction and mode of operation shown and described for illustrative purposes.

We claim:

1. In a planetary gear transmission, a driving shaft, a driven shaft, a reversing planetary gear train and a plurality of forwardly driving planetary gear trains operably connecting said shafts for selectively transmitting reverse or any one of a plurality of forward speed ratio drives from said driving shaft to said driven shaft, and an overrunning clutch including clutching members respectively drivingly connected to said driving and driven shafts, said overrunning clutch being so constructed and arranged as to provide overrun of said clutching members during said reverse and forward speed ratio drives and to drivingly connect said shafts when said driven shaft tends to overrun said driving shaft with the transmission in neutral.

2. In a planetary gear transmission, a driving shaft, a driven shaft, a reversing planetary gear train and a plurality of forwardly driving planetary gear trains operably connecting said shafts for selectively transmitting reverse or any one of a plurality of forward speed ratio drives from said driving shaft to said driven shaft, and an overrunning clutch including clutching members respectively connected to said driving and driven shafts for rotation at the same respective speeds therewith, said overrunning clutch being so constructed and arranged as to provide overrun of said clutching members during said reverse and forward speed ratio drives and to drivingly connect said shafts when said driven shaft tends to overrun said driving shaft with the transmission in neutral.

3. In a planetary gear transmission, a driving shaft, a driven shaft, a reversing planetary gear train and a plurality of forwardly driving planetary gear trains operably connecting said shafts for selectively transmitting reverse or any one of a plurality of forward speed ratio drives from said driving shaft to said driven shaft, and an overrunning clutch including clutching members, one of said clutching members being driven by and at the speed of one of said shafts, the other of said clutching members being drivingly connected to a gear element of one of said planetary gear trains, said overrunning clutch being so constructed and arranged as to provide overrun of said clutching members during said reverse and forward speed ratio drives and to drivingly connect said shafts when said driven shaft tends to overrun said driving shaft with the transmission in neutral.

4. In a planetary gear transmission, a driving shaft, a driven shaft, a reversing planetary gear train and a plurality of forwardly driving planetary gear trains operably connecting said shafts for selectively transmitting reverse or any one of a plurality of forward speed ratio drives from said driving shaft to said driven shaft, one of said planetary gear trains including a gear element drivingly connected to one of said shafts, and an overrunning clutch including clutching members, one of said clutching members being drivingly connected to said gear element and the other being drivingly connected to the other of said shafts for rotation at the same speed therewith, said overrunning clutch being so constructed and arranged as to provide overrun of said clutching members during said reverse and forward speed ratio drives and to drivingly connect said shafts when said driven shaft tends to overrun said driving shaft with said transmission in neutral.

5. In a planetary gear transmission, a driving shaft, a driven shaft, a reversing planetary gear train and a plurality of forwardly driving planetary gear trains operably connecting said shafts for selectively transmitting reverse or any one of a plurality of forward speed ratio drives from said driving shaft to said driven shaft, and an overrunning clutch including clutching members, one of said clutching members being driven by and at the speed of said driven shaft, the other of said clutching members being drivingly connected to a gear element of one of said planetary gear trains, said overrunning clutch being so constructed and arranged as to provide overrun of said clutching members during said reverse and forward speed ratio drives and to drivingly connect said shafts when said driven shaft tends to overrun said driving shaft with the transmission in neutral.

6. In a planetary gear transmission, a driving shaft, a driven shaft, a reversing planetary gear train and a plurality of forwardly driving planetary gear trains operably connecting said shafts for selectively transmitting reverse or any one of a plurality of forward speed ratio drives from said driving shaft to said driven shaft, one of said planetary gear trains including a gear element having rotation at a speed different from that of said driven shaft during at least one of said forward speed ratio drives, and an overrunning clutch including clutching members, one of said clutching members being driven by and at the speed of said driving shaft, the other of said clutching members being drivingly connected to said gear element, said overrunning clutch being so constructed and arranged as to provide overrun of said clutching members during said reverse and forward speed ratio drives and to drivingly connect said shafts when said driven shaft tends to overrun said driving shaft with the transmission in neutral.

7. In a planetary transmission, a driving shaft, a driven shaft, a reversing planetary gear train and a plurality of forwardly driving planetary gear trains operably connecting said shafts, each of said gear trains including a rotary control element, means associated with each of said control elements for operably engaging such control element, and overrunning clutch means operably connecting said shafts when said driven shaft tends to overrun said driving shaft with said control element engaging means of each of said elements inoperative, said overrunning clutch means providing unrestricted relative rotation of said driving and driven shafts during the drive through each of said gear trains.

8. In a planetary gear transmission, a driving shaft, a driven shaft coaxially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, braking means adapted to arrest rotation of said low speed annulus for causing said primary sun gear to drive said driven shaft at low speed, a second speed sun gear coaxial with said driving shaft and rotatable independently thereof, a second speed annulus directly drivingly connected to said low speed carrier, second speed planetary gears drivingly engaged with said second speed sun gear and second speed annulus, a second speed carrier for said second speed planetary gears directly drivingly connected to said low speed annulus, braking means adapted to arrest rotation of said second speed sun gear with said low speed annulus released from its said braking means for causing said primary sun gear to driving said driven shaft in second speed, and an overrunning clutch including clutching members respectively driven with said driving shaft and with said second speed sun gear, said overrunning clutch being so constructed and arranged as to provide overrun between said clutching members during said low speed and second speed drives, and to drivingly connect said driving and driven shafts, when said driven shaft tends to overrun said driving shaft with each of said braking means inoperative.

9. In a planetary gear transmission, a driving shaft, a driven shaft coaxially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, means adapted to arrest rotation of said low speed annulus for causing said primary sun gear to drive said driven shaft at low speed, a second speed sun gear coaxial with said driving shaft and rotatably independently thereof, a second speed annulus directly drivingly connected to said driving shaft, second speed planetary gears drivingly engaged with said second speed sun gear and second speed annulus, a second speed carrier for said second speed planetary gears directly drivingly connected to said low speed annulus, and means adapted to arrest rotation of said second speed sun gear with said low speed annulus released from its said arresting means for causing said primary sun gear to drive said driven shaft in second speed.

10. In a planetary gear transmission, a driving shaft, a driven shaft coaxially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, means adapted to arrest rotation of said low speed annulus for causing said primary sun gear to drive said driven shaft at low speed, a second speed sun gear coaxial with said driving shaft and rotatable independently thereof, a second speed annulus directly drivingly connected to said driving shaft, second speed planetary gears drivingly engaged with said second speed sun gear and second speed annulus, a second speed carrier for said second speed planetary gears directly drivingly connected to said low speed annulus, means adapted to arrest rotation of said second speed sun gear for causing said primary sun gear to drive said driven shaft in second speed, and direct drive clutching means for directly drivingly connecting said driving shaft with said second speed sun gear for causing said driving shaft to directly drive said driven shaft.

11. In a planetary gear transmission, a driving shaft, a driven shaft coaxially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, means adapted to arrest rotation of said low speed annulus for causing said primary sun gear to drive said driven shaft at low speed, a second speed sun gear coaxial with said driving shaft and rotatable independently thereof, a second speed annulus directly drivingly connected to said driving shaft, second speed planetary gears drivingly engaged with said second speed sun gear and second speed annulus, a second speed carrier for said second speed planetary gears directly drivingly connected to said low speed annulus, means adapted to arrest rotation of said second speed sun gear for causing said primary sun gear to drive said driven shaft in second speed, a reverse speed sun gear coaxial with said driven shaft and rotatable independently thereof, a reverse speed annulus, reverse speed planetary gears drivingly engaged with said reverse speed sun gear and reverse speed annulus, means directly drivingly connecting said low speed annulus with said reverse speed sun gear, a reverse speed carrier for said reverse speed planetary gears directly drivingly connected to said driven shaft, and means adapted to arrest rotation of said reverse speed annulus for causing said primary sun gear to drive said driven shaft in reverse.

12. In a planetary gear transmission, a driving shaft, a driven shaft coaxially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, means adapted to arrest rotation of said low speed annulus for causing said primary sun gear to drive said driven shaft at low speed, a second speed sun gear coaxial with said driving shaft and rotatable independently thereof, a second speed annulus directly drivingly connected to said driving shaft, second speed planetary gears drivingly engaged with said second speed sun gear and second speed annulus, a second speed carrier for said second speed planetary gears directly drivingly connected to said low speed annulus, means adapted to arrest rotation of said second speed sun gear for causing said primary sun gear to drive said driven shaft in second speed, direct drive clutching means for directly drivingly connecting said driving shaft with said second speed sun gear for causing said driving shaft to directly drive said driven shaft, a reverse speed sun gear coaxial with said driven shaft and rotatable independently thereof, a reverse speed annulus, reverse speed planetary gears drivingly engaged with said reverse speed sun gear and reverse speed annulus, means directly drivingly connecting said low speed annulus with said reverse speed sun gear, a reverse speed carrier for said reverse speed planetary gears directly drivingly connected to said driven shaft, and means adapted to arrest rotation of said reverse speed annulus for causing said primary sun gear to drive said driven shaft in reverse.

13. In a planetary transmission having a driving shaft, a plurality of groups of forwardly driving planetary gear sets operably associated with said driving shaft, a driven shaft in operable connection with the first group of gears, means for driving said driven shaft at one forward reduction speed from the sun gear of the first group of gears by holding the annulus of the first gear group, and means whereby another forward reduction drive resulting from the compounding of the first and second gear groups is obtained by holding the sun of the second group of gears, the planet gear carrier of said first gear group being directly drivingly connected with said driven shaft, the sun gear of said first group of gears and the annulus of said second group of gears being directly drivingly connected to said driving shaft.

14. In a planetary transmission having a driving shaft, a plurality of groups of forwardly driving planetary gear sets operably associated with said driving shaft, a driven shaft in operable connection with the first group of gears, means for driving said driven shaft at one forward reduction speed from the sun gear of the first group of gears by holding the annulus of the first gear group, means whereby another forward reduction drive resulting from the compounding of the first and second gear groups is obtained by holding the sun of the second group of gears, the planet gear carrier of said first gear group being directly drivingly connected with said driven shaft, the sun gear of said first group of gears and the annulus of said second group of gears being directly drivingly connected to said driving shaft, and means for holding the sun gear of said second gear group with said driving shaft to provide a direct drive between said shafts.

15. In a motor vehicle transmission for selectively varying the speed ratio drive between driving and driven shafts, a plurality of selectively controllable gear train driving means operably connecting said shafts for forward and reverse drives therebetween, said driving shaft having rotation only in a forward drive direction, means for selectively operably controlling said plurality of driving means, and means operably connecting said shafts when said driven shaft tends to overrun said driving shaft, with said transmission in its neutral setting.

16. In a motor vehicle transmission for selectively varying the speed ratio drive between driving and driven shafts, a plurality of selectively controllable gear train driving means operably connecting said shafts for forward and reverse drives therebetween, said driving shaft having rotation only in a forward drive direction, means for selectively operably controlling said plurality of driving means, and means operably connecting said shafts for a direct drive therebetween when said driven shaft tends to overrun said driving shaft, with said transmission in its neutral setting.

17. In a motor vehicle transmission, a driving shaft adapted for only forward rotation, a driven shaft adapted for forward and reverse rotation, selectively operable mechanism coupling said shafts for transmitting variable speed ratio forward drives and a reverse drive from said driving shaft to said driven shaft, means acting in response to tendency of said driven shaft to forwardly overrun said driving shaft for releasably coupling said shafts when the transmission is in its neutral setting, said releasable means automatically uncoupling said shafts in response to transmission of each of said forward and reverse drives from said driving shaft to said driven shaft.

18. In a planetary transmission; a forwardly rotatable driving shaft; a driven shaft coaxial with the driving shaft; planetary reduction gearing for driving the driven shaft from the driving shaft in a forward direction of rotation and at a slower speed, comprising, a sun gear element driven directly with the driving shaft, a carrier element directly drivingly connected with the driven shaft, a planet gear element carried by said carrier element and meshing with said sun gear element, an annulus gear element meshing with said planet gear element, means operating to arrest rotation of said annulus gear element thereby to effect said drive through said planetary reduction gearing; additional planetary reduction gearing for driving the driven shaft in a forward direction of rotation by compounding with the first said planetary reduction gearing to effect a drive faster than that aforesaid, said additional planetary reduction gearing comprising, a second sun gear element, a second planet gear element meshing with the second said sun gear element, a second carrier element for the second said planet gear element directly drivingly connected with the first said annulus gear element, a second annulus gear element meshing with the second said planet gear element and directly drivingly connected with one of the first two said elements of the first said planetary reduction gearing, means operating to arrest rotation of the second said sun gear element thereby to effect said faster drive; and an overrunning clutch including clutching members, one of said clutching members being directly driven with one of said shafts, the other of said clutching members being directly driven with one of the aforesaid elements, said overrunning clutch being so constructed and arranged as to provide overrun of said clutching members during each of the aforesaid drives and to drivingly connect said shafts when said driven shaft tends to overrun said driving shaft.

19. In a planetary transmission; a forwardly rotatable driving shaft; a driven shaft coaxial with the driving shaft; planetary reduction gearing for driving the driven shaft from the driving shaft in a forward direction of rotation and at a slower speed, comprising, a sun gear element driven directly with the driving shaft, a carrier element directly drivingly connected with the driven shaft, a planet gear element carried by said carrier element and meshing with said sun gear element, an annulus gear element meshing with said planet gear element, means operating to arrest rotation of said annulus gear element thereby to effect said drive through said planetary reduction gearing; additional planetary reduction gearing for driving the driven shaft in a forward direction of rotation by compounding with the first said planetary reduction gearing to effect a drive faster than that aforesaid, said additional planetary reduction gearing comprising, a second sun gear element, a second planet gear element meshing with the second said sun gear element, a second carrier element for the second said planet gear element directly drivingly connected with the first said annulus gear element, a second annulus gear element meshing with the second said planet gear element and directly drivingly connected with one of the first two said elements of the first said planetary reduction gearing, means operating to arrest rotation of the second said sun gear element thereby to effect said faster drive; and an overrunning clutch including clutching members, one of said clutching members being directly driven with said driving shaft, the other of said clutching members being directly driven with one of the aforesaid elements, said overrunning clutch being so constructed and arranged as to provide overrun of said clutching members during each of the aforesaid drives and to drivingly connect said shafts when said driven shaft tends to overrun said driving shaft.

20. In a planetary transmission; a forwardly rotatable driving shaft; a driven shaft coaxial with the driving shaft; planetary reduction gearing for driving the driven shaft from the driving shaft in a forward direction of rotation and at a slower speed, comprising, a sun gear element driven directly with the driving shaft, a carrier element directly drivingly connected with the driven shaft, a planet gear element carried by said carrier element and meshing with said sun gear element, an annulus gear element meshing with said planet gear element, means operating to arrest rotation of said annulus gear element thereby to effect said drive through said planetary reduction gearing; additional planetary reduction gearing for driving the driven shaft in a forward direction of rotation by compounding with the first said planetary reduction gearing to effect a drive faster than that aforesaid, said additional planetary reduction gearing comprising, a second sun gear element, a second planet gear element meshing with the second said sun gear element, a second carrier element for the second said planet gear element directly drivingly connected with the first said annulus gear element, a second annulus gear element meshing with the second said planet gear element and directly drivingly connected with one of the first two said elements of the first said planetary reduction gearing, means operating to arrest rotation of the second said sun gear element thereby to effect said faster drive; and an overrunning clutch including clutching members, one of said clutching members being directly driven with one of said shafts, the other of said clutching members being directly driven with one of the aforesaid elements; further planetary reduction gearing for driving the driven shaft in a reverse direction of rotation by compounding with the first said planetary reduction gearing, said further planetary gearing comprising, a sun gear member directly drivingly connected with the first said annulus gear element, an annulus gear member, a planet gear member meshing with said sun gear member and with said annulus gear member, a carrier member for said planet gear member directly drivingly connected with said driven shaft, means operating to arrest rotation of said annulus gear member thereby to effect said reverse drive; said overrunning clutch being so constructed and arranged as to provide overrun of said clutching members during each of the aforesaid forward drives and during said reverse drive and to drivingly connect said shafts when said driven shaft tends to overrun said driving shaft with the transmission in neutral.

21. In a planetary transmission; axially aligned driving and driven shafts; planetary gearing operable between said shafts for driving the driven shaft from the driving shaft at a reduced speed; means operable to lock said planetary gearing to effect a direct drive therethrough from the driving shaft to the driven shaft; and overrunning clutch means operable to establish drive connection from the driven shaft to the driving shaft when the driven shaft tends to overrun the driving shaft.

CARL A. NERACHER.
WILLIAM T. DUNN.